United States Patent [19]

Morimoto et al.

[11] Patent Number: 4,831,942
[45] Date of Patent: May 23, 1989

[54] METHOD OF CONTROLLING DEACTIVATION OF DENITRATING CATALYST

[75] Inventors: Iwao Morimoto; Hiroshi Sasaki, both of Hiroshima, Japan

[73] Assignee: Toa Trading Co., Ltd., Tokyo, Japan

[21] Appl. No.: 86,317

[22] Filed: Aug. 17, 1987

[30] Foreign Application Priority Data

Aug. 15, 1986 [JP] Japan ............................ 61-191514
Apr. 8, 1987 [JP] Japan ............................ 62-86170

[51] Int. Cl.⁴ .............................................. F23J 11/00
[52] U.S. Cl. ...................................... 110/345; 44/505; 44/641; 110/342; 110/347
[58] Field of Search ............... 110/342, 343, 344, 345, 110/347; 44/641, 505

[56] References Cited

U.S. PATENT DOCUMENTS

| | | | |
|---|---|---|---|
| 4,173,454 | 11/1979 | Heins ........................... | 110/345 X |
| 4,381,718 | 5/1983 | Carver et al. .................. | 110/342 X |
| 4,388,877 | 6/1983 | Molayem et al. ............... | 110/345 X |
| 4,572,085 | 2/1986 | Hepworth ...................... | 110/342 X |

FOREIGN PATENT DOCUMENTS 59-230623 12/1984 Japan.
60-64111 4/1985 Japan.
60-202741 10/1985 Japan.

OTHER PUBLICATIONS

Patent Abstracts of Japan, vol. 9, No. 175, Jul. 19, 1985, "Method for Improving Fuel Quality".
Patent Abstracts of Japan, vol. 10, No. 63, Mar. 13, 1986, "Treatment of Denitration Catalyst".
Patent Abstracts of Japan, vol. 8, No. 138, Jun. 27, 1984, "Activating Method of Denitration Catalyst".
Patent Abstracts of Japan, vol. 9, No. 171, Jul. 16, 1985, "Method of Preventing Deterioration of Catalyst for Removing Nitrogen Oxide".

Primary Examiner—Edward G. Favors
Attorney, Agent, or Firm—Wenderoth, Lind & Ponack

[57] ABSTRACT

The deactivation of a denitrating catalyst that is caused by exhaust gas dust in a boiler, a furnace or the like which employs a fossil fuel, particularly pulverized coal, can be controlled with excellent results by adding to a fuel at a mill installed in a coal fuel line or at a point upstream of the mill at least one iron compound in a small amount in the form of an aqueous solution, or a powder or water slurry containing coal particles, or in case of employing pulverized coal or heavy oil as a fuel by adding a mixture of an iron compound, a vanadium compound and a tungsten compound, said mixture being in the form of powder, a water slurry or an oil slurry of powder, or an aqueous solution.

5 Claims, 7 Drawing Sheets

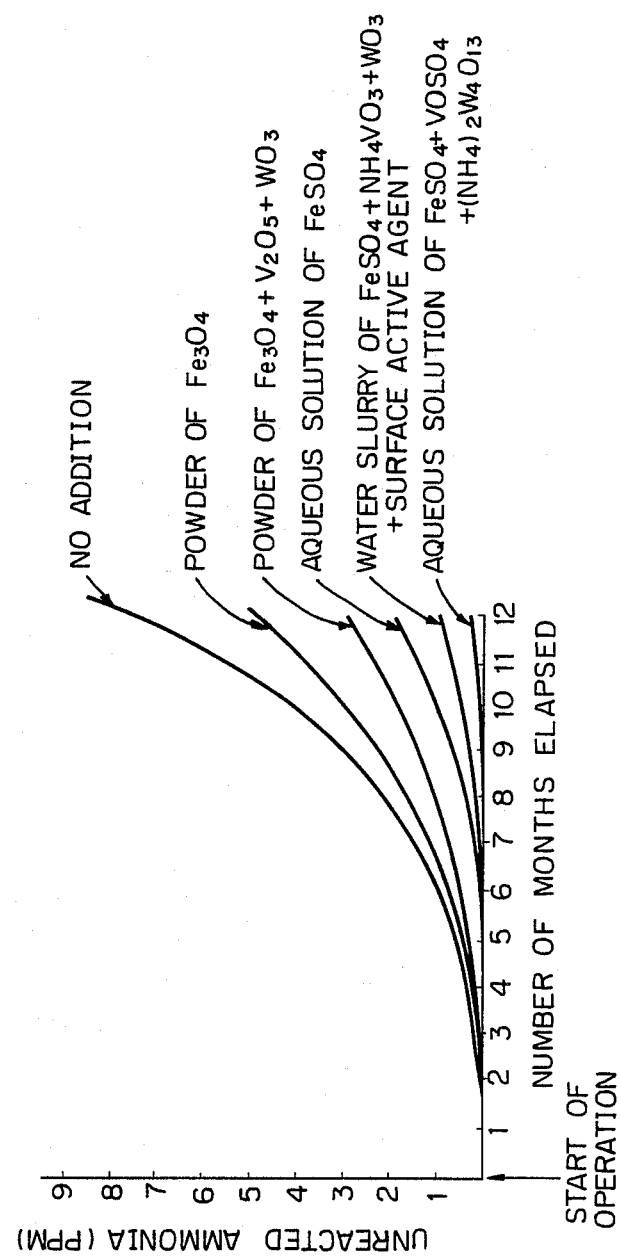

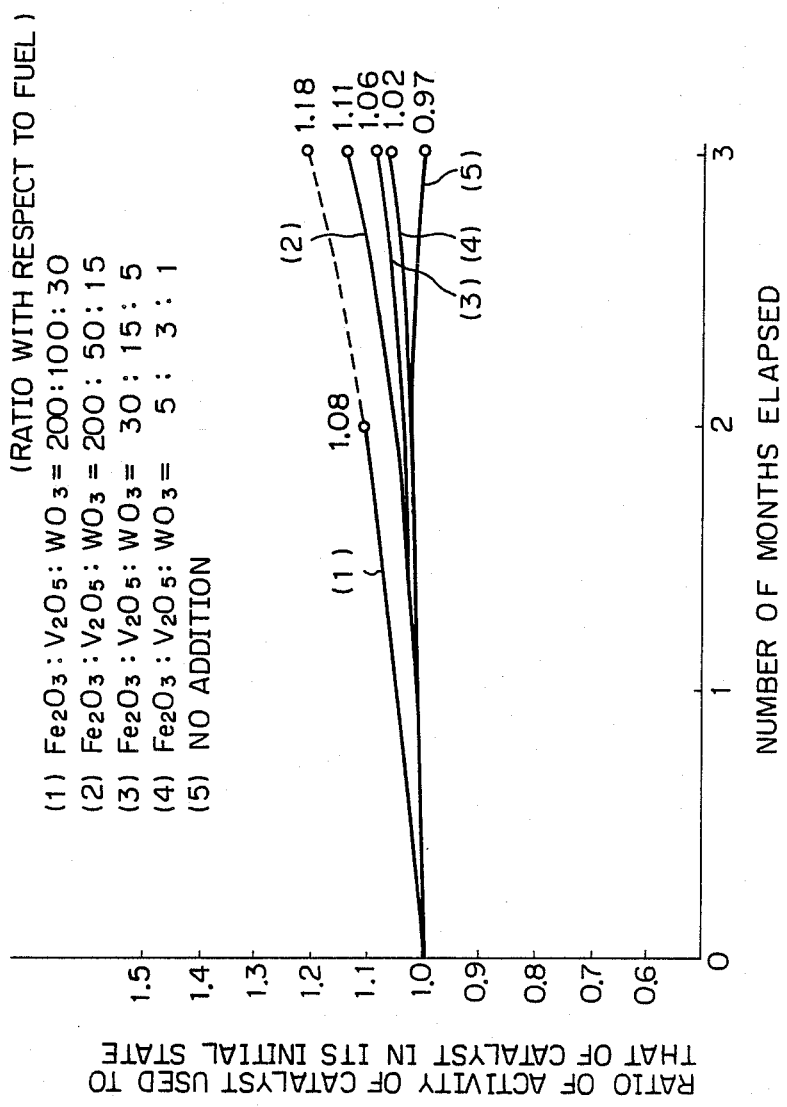

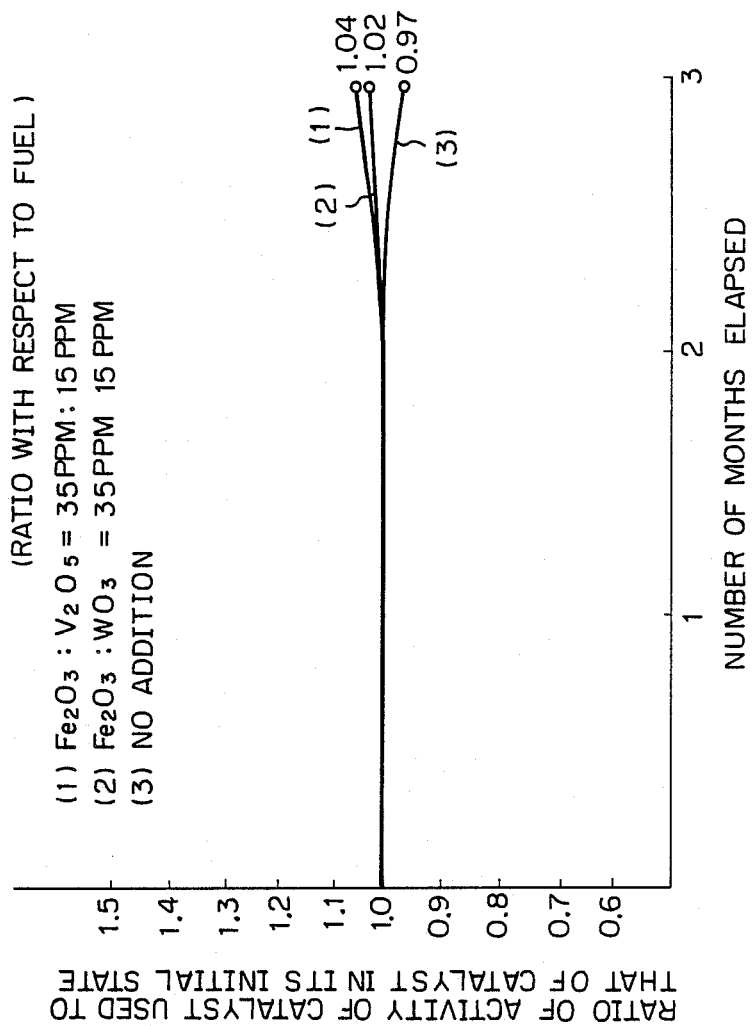

METHOD OF CONTROLLING DEACTIVATION OF DENITRATING CATALYST

BACKGROUND OF THE INVENTION

1. Field of the Invention

The present invention relates to a method of controlling the deactivation of a denitrating catalyst resulting from an exhaust gas dust in a boiler, a furnace or the like which employs a fossil fuel such as heavy oil, pulverized coal, COM, CWM, etc.

2. Description of the Prior Art

As environmental pollution grows worse, boilers, furnaces and the like which employ fossil fuels such as coal and petroleum suffer from the imposition of particularly strict environmental regulations these days. In regard to fuels, particularly coal and petroleum, those which have a relatively high content of N matter or S matter are relatively low in cost and are therefore in general use. Under these circumstances, the discharge of nitrogen oxides has become a serious world-wide problem. A particularly serious problem is the effect of nitrogen oxides on acid rain and other similar undesirable phenomena.

Examples of measures designed to reduce the generation of nitrogen oxides NOx from fossil fuels include: (1) improvements in burning techniques, for example, low oxygen combustion, two-stage combustion, exhaust gas recirculation combustion, and low NOx burner, (2) selection of fuel types (selection of fuels having a low content of N matter); and (3) development of exhaust gas denitration techniques. Among these measures, (3) is considered to be the most practical approach.

Examples of exhaust gas denitration techniques include: the catalytic reduction method in which NOx is reduced into $N_2$ at 300° C. to 400° C. by means of a reducing gas such as ammonia in the presence of a catalyst; the catalytic decomposition method in which NOx is decomposed at 700° C. to 800° C. in the presence of a catalyst; and the absorption method in which NOx is absorbed into active carbon. Among them the catalytic reduction method which consists of a relatively simple process and utilizes ammonia is widely used and is regarded as being the most reliable. This invention relates to this dry ammonia catalytic reduction method.

The principle of this method is that NOx is reduced into $N_2$ and $H_2O$ generally by adding $NH_3$ to the exhaust gas (300° C. to 400° C.) from a boiler outlet and then by passing the resultant mixture through a catalyst layer (for example, $V_2O_2$, $Fe_2O_3$, $WO_3$, etc.) in a reaction vessel. This process is simple and suitable for treating a large volume of exhaust gas. The reaction formulae of this process are shown as follows:

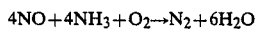

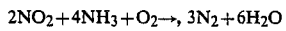

Another method is the non-catalytic reduction method which consists of injecting ammonia into a high temperature area of about 800° C to 1100° C and effecting denitration in the absence of a catalyst. However, this method is hardly even used.

This invention relates to the above-mentioned dry ammonia catalytic reduction method. The most serious problem of this method is deactivation of the catalyst employed, which causes a reduced denitration efficiency and thus leads to the need for an increased amount of ammonia to be added. However, increasing the amount of ammonia added leads to an increased amount of unreacted ammonia passing through the denitrize, and this unreacted ammonia reacts with the $SO_2$ and $SO_3$ present in a gas to produce $NH_4HSO_4$ which has a low melting point of 147° C. Adhesion of this low-melting point substance to the elements of a downstream air heater (AH) causes clogging of the elements and a rising draft, which may in turn result in an unexpected shut-down. In order to prevent such a problem, inspection and repair of the catalyst becomes very important.

Causes of catalyst deactivation may be considered as follows:

(1) alkali metals such as Na, K, and alkaline earth metals such as Ca, Mg, Ba react with $SO_3$ and the like to produce sulfates, which enter the catalyst receptacle to cause clogging of the catalyst;

(2) the surface of the catalyst may become coated with ash (particularly, Si, Al, unburnt matter, etc.) that is present in an exhaust gas, resulting in a reduction in the surface area of the catalyst;

(3) the catalyst may be poisoned and deactivated by sulfur oxides such as $SO_2$; and (4) a decrease in the amount of catalyst compounds (wear of catalyst components by dust and eluation of catalyst components by water).

In order to solve these problems, the catalyst is water-washed to remove any adhering matter after a boiler shut-down. If the catalyst function can be restored without stopping the boiler operation, great financial advantage will be obtained. Under these circumstances, a method of adding an iron compound powder just before and after the position of a denitrizer by using a sootblower is employed. The iron compounds added include $Fe_2O_3$, $Fe_3O_4$, $Fe(OH)_2$, $Fe(OH)_3$, $FeCO_3$, FeOOH, etc.

However, this method has the following problems:

(1) since ordinary iron compound powders have large particle diameters, their activity is low, and a small specific surface area requires the addition of a large amount of powder;

(2) the use of an iron compound powder having a small particle diameter (about 0.1 μm) increases the cost considerably, and since the particles are small, they are readily blown off rearward by means of the gas stream or the pressure from the sootblower, and therefore the proportion of particles adhering to the catalyst inside the denitrizer is uneconomically small;

(3) a powder surface with sharp angles causes erosion of the catalyst under the pressure applied by the sootblower, resulting in accelerated deactivation; and (4) since the position where an iron compound powder is added is just before or near the denitrizer and the temperature (300° C. to 400° C.) thereat is therefore lower than the temperature (600° C. or higher) at which the iron compound gains activity, most of the iron compound which is charged in large amounts does not function as a catalyst, resulting in extensive waste.

On the other hand, if an iron compound powder is added to a gas atmosphere with a temperature of 600° C. or higher, a large amount of iron compound may be deposited on the heating surfaces of various devices which are disposed on the downstream side, such as a superheater (SH), a reheater (RH), a feedwater heater or economizer (ECO), etc., resulting undesirably in a rise in the exhaust gas temperature and an increase in the draft in the furnace.

Although iron compounds are inexpensive, they are readily poisoned and deactivated by SOx, and therefore employment of an iron compound alone limits any possible extension of the life of the catalyst. For this reason, methods have heretofore been proposed wherein an oxide of a heavy metal such as Ti, V, W or the like is employed as an active ingredient as well as an iron compound and is injected into the denitrizer using an ammonia injection nozzle or the like. These oxides of heavy metals are added in the form of an aqueous solution of an ammonia compound.

These methods, however, suffer from the following disadvantages:

(1) Since the denitrizer and structures in its vicinity are generally formed from structural carbon steel SS and the temperature near the denitrizer is about 300° C. to 400° C., addition of the above-described oxidizing water-soluble substance causes corrosion of the steel material.

(2) Since the position where the ammonia compound aqueous solution is injected is ahead of the position of the denitrizer, the injected solution cannot effectively be dispersed into the exhaust gas. Therefore, if there are a plurality of catalyst layers, the ammonia compound solution cannot be uniformly attached thereto, i.e., an excessive amount of the solution may adhere to the first layer, or the catalyst may partially be coated with the injected solution in excessively large amounts due to the action of a gas drift. Accordingly, in order to obtain effective results it is necessary to charge a large amount of the ammonia compound aqueous solution, i.e., 500 to 600 ppm or more.

(3) Most alkali metals in coal, such as K, Na and Mg, adhere to the catalyst layer in the form of sulfates. Therefore, if an additive in the form of an aqueous solution is injected ahead of the position of the denitrizer, water and steam wet the catalyst layer together with such sulfates and dust, and this leads to an increase in the amount of alkali sulfates, which are even more soluble in water, resulting in an increase in the amount of substance poisoned.

(4) The temperature at the position where the oxide of a heavy metal is added is about 300° C.. to 400° C.., which is much lower than the temperature (about 600° C.. to 700° C..) at which the oxide gains activity. Accordingly, in order to obtain adequate activity a large amount of the oxide must be charged. However, the addition of a large amount of the above-described oxidizing substance increases the rate of oxidation, i.e., $SO_2 \rightarrow SO_3$, so that $SO_3$ increases by a large margin and corrosion due to $H_2SO_4$ is accelerated.

Thus, the addition of a large amount of these heavy metal substances ahead of the position of the denitrizer involves many problems.

It has heretofore been considered that vanadium compounds act as a strong oxidizing catalyst, have a low melting point and produce low-melting compounds such as $n.Na_2O.mV_2O_5$ to corrode tubes in boilers and the like, and therefore they have been excluded from the group of substances which may be employed as additives for the abovedescribed purposes. On the other hand, tungsten oxides are known as oxidizing catalysts having a high melting point which act so as to cover the low-melting property of vanadium. However, these compounds have not been positively added to fuel.

If these substances are added in excessive amount, the rate of oxidation, i.e., $SO_2 \rightarrow SO_3$, increases, and this leads to corrosion of boilers, furnaces and the like and causes an increase in the amount of slag on the heating surfaces. Therefore, the effect and side effects of the addition of such substances are greatly affected by the particle diameter and amount of iron compound charged and those of the vanadium and tungsten compounds added thereto. Accordingly, it is very important to select optimal particle diameters and amounts of these substances.

SUMMARY OF THE INVENTION

It is therefore an object of the present invention to provide a method of treating a catalyst in order to control the rate of deactivation thereof and extend its life by adding in a coal mill or at a point upstream of the mill a small amount of an iron compound in the form of an aqueous solution or a powder or water slurry containing coal particles capable of passing through a 100-mesh screen so as to cause the iron compound to adhere strongly to the coal particles, the catalytic activity of the iron's oxidizing action increasing due to the high temperature of a furnace and a reducing atmosphere, and the activated catalyst then being caused to adhere to a catalyst present in a downstream denitrizer.

It is another object of the present invention to provide a method of controlling the deactivation of a denitrating catalyst that is caused by an exhaust gas dust in a boiler, a furnace or the like which employ a fossil fuel wherein at least one of the oxidizing catalysts which are not readily poisoned by SOx such as vanadium and tungsten compounds is added in a very small amount to a relatively small amount of an iron compound having a small particle diameter to reduce the rate at which the catalyst is poisoned by SOx and increase the catalytic activity of the iron's oxidizing action, thereby controlling the deactivation of the catalyst inside a denitrizer and extending the life thereof, and thus obtaining industrially excellent effects and suppressing the adverse effect on the boiler, furnace or the like due to the addition of the oxidizing catalyst.

Other objects and advantages of the present invention will become apparent to those skilled in the art from the following description and disclosure.

BRIEF DESCRIPTION OF THE DRAWINGS

FIG. 5 shows the amount of unreacted ammonia (ppm) measured every time a predetermined operating time has elapsed during the operation carried out using the same catalytic additives as those in FIG. 4;

FIG. 6 shows the ratio of the activity of the catalyst used to that of the catalyst in its initial state for 3 months in the case where the proportion of each additive with respect to fuel is changed; and FIG. 7 shows the ratio of the activity of the catalyst used to that of the catalyst in its initial state for 3 months with respect to the same catalytic compounds as those in Example 3 except that in this case $V_2O_5$ or $WO_3$ is added to $Fe_2O_3$.

DETAILED DESCRIPTION OF THE PREFERRED EMBODIMENT

Figure 1:
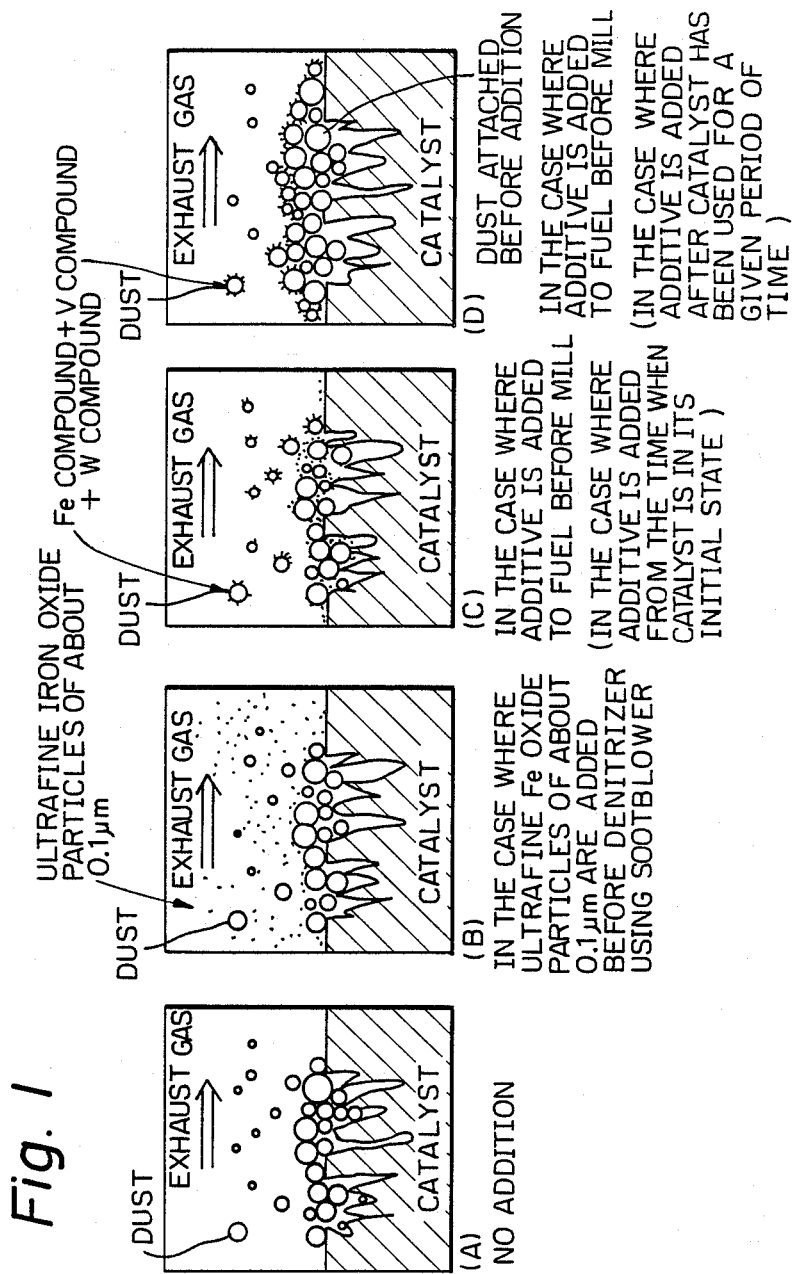
FIG. 1 is a schematic drawing of showing the way in which dust particles and additive particles adhere to the surface of a denitrating catalyst in the case where no additive is employed and in the case where various kinds of additive are employed.

In a method of reducing the NOx present in an exhaust gas by using a denitrating catalyst in a boiler, a furnace or the like which employs a pulverized coal as a fuel, deactivation of a denitrating catalyst can be effectively prevented by adding to a mill installed in a fuel line or at a point upstream of the mill an iron compound having an extremely small particle diameter in an amount in the range of 5 to 2000 ppm relative to the amount of fuel, by further pulverizing the added iron compound together with coal agglomerates in the mill to ensure even and strong adhesion of the iron compound to the surface of coal particles, by conducting the iron compound into an exhaust gas dust together with alkali metal oxides such as $Na_2O$, $K_2O$, etc., alkaline earth metal oxides such as CaO, MgO, BaO, etc., or unburnt carbon, and then by ensuring adhesion of the iron compound to a catalyst layer in a denitrating reactor. Also, because the iron compound can be activated by reduction in a high temperature region, $Fe_2O_3$ or $Fe_3O_4$ is produced as an oxidizing catalyst on the surface of fly ash. Coal usually contains 2 to 20% by weight of iron compounds, most of which are present as $FeS_2$, $FeCO_3$ or the like. These compounds lie buried in the coal particles and stay in them after burning, so that most of these compounds may not show adsorptive action toward NOx as catalysts. When iron compounds are burnt together with coal particles, catalyst poisoning substances in coal such as CaO, $Na_2O$, sulfur-containing matter, and the like fall as clinker to the bottom of a furnace to some extent, resulting in an extension of the life of the catalyst.

Water-soluble iron salts such as ferrous sulfate, iron acetate, iron chlorides ($FeCl_3$, $FeCl_4$), iron hydroxides ($Fe(OH)_2$, $Fe(OH)_3$) and the like and aqueous solutions thereof are effective as iron compounds for this invention. Powders such as $Fe_2O_3$, $Fe_3O_4$, FeO, FeOOH, $Fe(OH)_3$, $Fe(OH)_2$ and the like and water slurries thereof are also effective as iron compounds provided that their particle diameter is smaller than 100 mesh pass. It is a matter of course that the smaller the particle diameter, the higher, the activity and the smaller the amount added.

Further, in a method of reducing the NOx present in an exhaust gas by using a denitrating catalyst in a boiler, a furnace or the like which employs a fossil fuel, deactivation of a denitrating catalyst can be effectively prevented by adding a small amount of the above-described additive due to the fact that the additive adheres to a catalyst layer in a denitrating reactor, together with alkali metal oxides such as $Na_2O$, $K_2O$, etc., alkaline earth metal oxides such as CaO, MgO, BaO, etc., unburnt carbon or exhaust gas dust, without any fear of the additive being poisoned by SOx in the exhaust gas, thus providing advantages of great economic value. In addition, since the additive has a small particle diameter and is added in a small amount, there is substantially no adverse effect such as corrosion of the boiler, furnace or the like.

It is possible to add at least one compound selected from the following three different kinds of compound, that is, iron compounds in an amount of 5 to 200 ppm (in terms of $Fe_2O_3$), vanadium compounds in an amount of 3 to 50 ppm (in terms of $V_2O_5$), and tungsten compounds in an amount of 1 to 15 ppm (in terms of $WO_3$). Within the above-described ranges, these compounds can be added without any adverse effect on the combustor and the effect of addition of the compounds is great. However, if the amount of each of these compounds is less than the lower limit, no effect can be expected.

Examples of iron compounds which may be effectively employed in the present invention include water-soluble ferrous salts such as organic acid ferrous salt, ferrous sulfate, ferrous acetate, ferrous chloride and iron hydroxide, or an aqueous solution, a water slurry and an oil slurry of these ferrous salts; and $Fe_2O_3$, $Fe_3O_4$, FeO, FeO.OH, $Fe(OH)_3$ and $Fe(OH)_2$ in the form of powder, a water slurry or an oil slurry.

Examples of vanadium compounds include water-soluble vanadium compounds such as organic acid vanadium salt, ammonium metavanadate ($NH_4VO_3$), vanadium sulfate ($VOSO_4$), sodium vanadates ($NaVO_3$, $Na_3VO_4$), or an aqueous solution of these compounds, and vanadium pentaoxide ($V_2O_5$), ferrous vanadate or the like in the form of powder and a water slurry.

Examples of tungsten compounds include water-soluble tungstates such as organic acid tungsten salt, ammonium tungstate [$(NH_4)_2W_4O_{18}$] and sodium tungstate ($Na_2WO_4$), or an aqueous solution of these tungstates, and tungsten oxides ($WO_3$, $WO_2$), tungsten carbide (WC), iron tungstate [$Fe(WO_4)_3$] or the like in the form of powder or a water slurry. It is a matter of course that as the particle diameter of these compounds decreases, the activity becomes stronger, and the amount of compound that needs to be added decreases.

As to the powder, the average particle diameter is preferably selected so as to be 5 $\mu$m or less. The smaller the particle diameter, the larger the specific surface area, and the stronger the activity. Therefore, the amount of powder added may be reduced. An average particle diameter in excess of 5 $\mu$m requires that a large amount of powder be added. As a result, an excessive amount of powder may adhere to the heating surfaces to lower the heat absorbing capacity, and this leads to a rise in the exhaust gas temperature, resulting in economic losses or trouble.

In the case of a water slurry or an oil slurry, the average particle diameter is preferably selected to be 2 to 3 $\mu$m or less. An average particle diameter in excess of 2 to 3 $\mu$m deteriorates the stability of the product, so that, even if an excellent surface active agent is used, particles are, undesirably, readily precipitated.

Accordingly, in either case, it is essential to grind the material employed using a mill such as a sand mill so that the average particle diameter is minimized.

In the present invention, a catalyst which is formed by coating an iron oxide, a vanadium oxide and a tungsten oxide onto a $TiO_2$ carrier is employed. Since the present invention enables a fresh active catalyst to be supplied at all times, the life of the denitrating catalyst can be extended irrespective of its composition. The carrier of the catalyst is not necessarily limited to $TiO_2$ and other substances may also be employed such as $Al_2O_3$ provided that the substance employed is not harmful.

The present invention will be described hereinunder in detail with reference to the accompanying drawings. FIGS. 1(A), I(B), 1(C) and I(D) show the way in which an additive adheres to a denitrating catalyst in comparison with the case where no additive is employed.

Referring first to FIG. 1(A), which shows the case where no additive is employed, dust particles attached to the catalyst may reduce the surface area of the catalyst and therefore lower the activity.

FIG. 1(B) shows ultrafine iron oxide particles (about 0.1 μm) blown off together with steam ahead of the position of the denitrizer by the use of a sootblower. Because of this sootblowing, the proportion of small iron oxide particles being discharged to the outside may be much larger than the amount of particles adhering to the catalyst, which is uneconomical. In addition, ultrafine iron oxide particles are very costly.

FIG. 1(C) shows the case where an additive is added to fuel before the position of a mill and the catalyst is in its fresh state. Since dust particles which have small iron particles attached to their surfaces may adhere to the surface of the catalyst, there is no fear of the surface area of the catalyst being reduced, and since an iron compound, a vanadium compound and a tungsten compound which are active are supplied at all times, lowering of the activity of the catalyst is prevented and the activity is improved instead.

FIG. 1(D) shows the case where an additive is added to fuel after the catalyst has been used for a given period of time. Iron, vanadium and tungsten compound particles (mainly in the form of oxides) which are attached to dust particles may adhere to the dust particles which have already been attached to the surface of the catalyst before the additive was used, thus preventing lowering of the activity.

Figure 2:
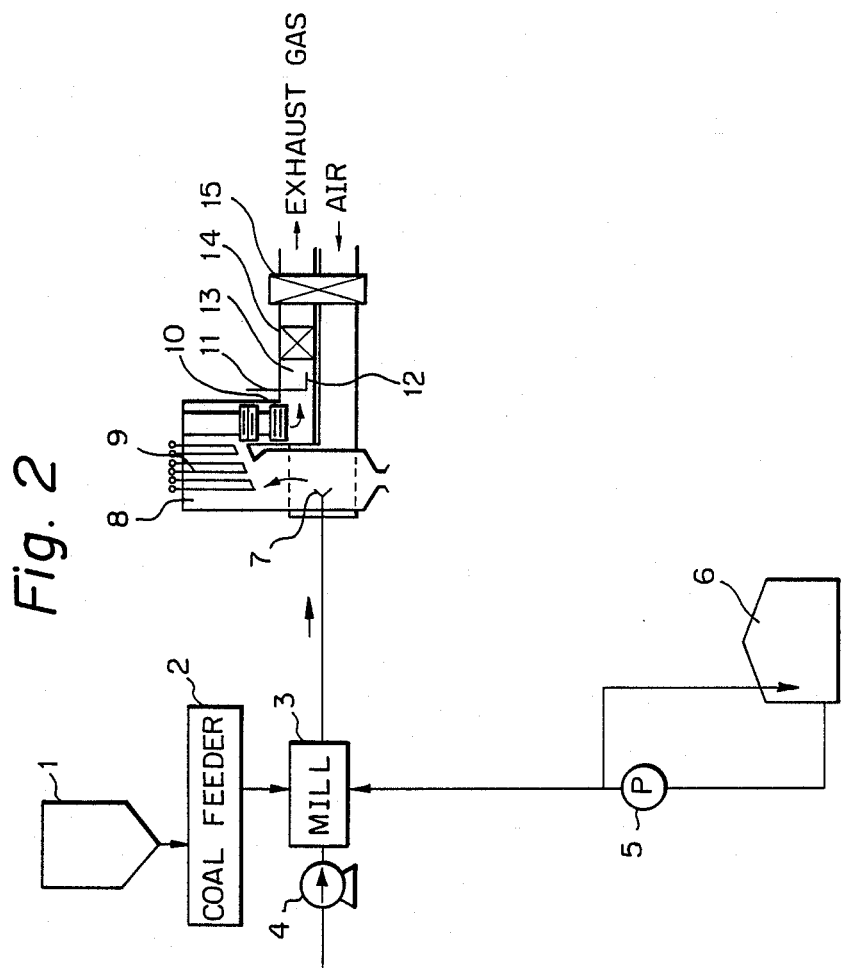
FIG. 2 is a schematic drawing of showing a coal combustion boiler used to practice the present invention.

In FIG. 2, reference numeral 1 denotes a bunker for temporarily storing coal, 2 is a coal feeder which weighs the coal delivered from the bunker and feeds a fixed amount of coal, 3 is a mill which pulverizes the coal to a particle size of less than 100 mesh preferably less than 200 mesh, 4 is a blower which uses air to convey the pulverized coal toward a burner 7, 6 is a storage tank containing an additive, and 5 is a pump which injects the additive. This is a constant-delivery pump which is capable of feeding a fixed amount of additive for a given amount of fuel. The injection point is located at an inlet of the mill 3, where the additive is blended with the pulverized coal. It is to be noted that the mill inlet is the most suitable point for injection because the iron compound is strongly pressed against the surface of coal particles by a roller in the mill. This leads to an increase in the oxidizing catalytic function of the iron carried on carbon. When there are a plurality of similar mills, it is effective to add an equal amount of additive at a point upstream of each mill. Reference numeral 8 is a boiler, 9 is a superheater (SH) which superheats vapor, 10 is an economizer (ECO) which heats feedwater, 11 is an ammonia-injecting line for denitrating, 12 is an injection nozzle, 13 is an exhaust gas duct, and 14 is a reaction vessel in which the reaction between ammonia and NOx takes place. NOx is reduced on a catalytic layer that is present in the reaction vessel into $N_2$ and $H_2O$. The amount of ammonia to be injected is measured at the inlet and outlet of the reaction vessel 14, and is automatically controlled so as not to give a lower rate than a predetermined denitration rate. Consequently, when the catalyst is deactivated to result in a lowered denitration rate, the amount of ammonia to be injected is increased. Reference numeral 15 denotes an air heater which heats air utilizing the heat of an exhaust gas. Once the exhaust gas has left the air heater it is discharged from a stack to the atmosphere via an electrostatic precipitator, a desulfurizer, and so forth.

In the case where the fuel is heavy oil, an additive which is in the form of an oil slurry or an oil-soluble organic acid salt is supplied to the high-pressure area immediately before the position of the burner by means of a constant delivery pump. The arrangement of the other section is the same as that in the case of a coal combustion boiler.

A detailed explanation of the present invention will now be given by way of Examples and Comparative Examples.

EXAMPLES

The denitrating catalyst used was prepared by coating a mixture consisting of 30% vanadium oxide, 55% iron oxide, and 15% tungsten oxide onto a TiO, carrier. The burning conditions of the boiler and the fuel properties were as follows:

(1) burning conditions: burning was carried out so as to give an excess air ratio of 44% $O_2$.
(2) fuel: ash 13.5%, volatile matter S0.8%, fixed carbon 5%, nitrogen matter 1.3%.
(3) additive to fuel: 1 no addition, 2 addition of an aqueous solution of ferrous sulfate ($FeSO_4$), 3 addition of a water slurry of ferrosoferric oxide ($Fe_3O_4$), 4 addition of a powder of ferrosoferric oxide ($Fe_3O_4$).

EXAMPLE 1

Table 1 shows the results obtained by charging an aqueous solution of ferrous sulfate into a mill installed in a coal fuel line according to the method of the present invention. The load of the boiler and the $O_2$ ratio at the ECO outlet were set to 175 MW and 4%, respectively.

TABLE I

|  | No addition | Addition of an aqueous solution of ferrous sulfate | | |
|---|---|---|---|---|
| Amount of additive added (ppm) (in terms of $Fe_2O_3$) | — | 5 | 50 | 2000 |
| NOx before denitrizer inlet (ppm) | 410 | 400 | 380 | 370 |
| NOx before denitrizer outlet (ppm) | 195 | 185 | 170 | 160 |
| Reduced amount of NOx at denitrizer outlet (ppm) | 215 | 215 | 210 | 210 |
| Denitration rate (%) | 52.4 | 53.8 | 55.3 | 56.8 |
| Amount of ammonia injected (kg/H) | 61 | 56 | 48 | 45 |
| Leakage of ammonia at denitrizer outlet (ppm) | 1 or less | 1 or less | 1 or less | 1 or less |
| Load (MW) | 175 | 175 | 175 | 175 |
| ECO outlet $O_2$ (%) | 4.0 | 3.9 | 4.0 | 3.9 |
| ECO outlet gas temperature (°C.) | 350 | 350 | 350 | 355 |

Note:
NOx is observed value before converting into $O_2$ 6%.

An aqueous solution of ferrous sulfate was added to the fuel in amounts of 5 ppm, 50 ppm and 2000 ppm (in terms of $Fe_2O_3$) for comparison with the case where none was added. The amount of NOx before the inlet of the denitrizer (reaction vessel) (observed value before convorting into O₂ 6%) was reduced from 410 ppm to 370 ppm, and the amount of NOx before the outlet of the denitrizer (observed value before converting into O₂ 6%) was reduced from 195 ppm to 160 ppm. Consequently, the denitration rate increased from 52.4% to 56.8%. Unreacted leakage ammonia at the outlet of the denitrizer was 1 ppm or less. This is the value obtained by undeactivated catalyst. The amount of ammonia injected decreased from 61 kg/H to 45 kg/H corresponding to the reduction of NOx, showing that the amount of NOx was definitely reduced at the outlet of the cenitrizer. The exhaust gas temperature at the ECo outlet was 350° C. with the addition amount of 50 ppm, which is the same temperature as in the case where no additive was used. However, when the amount added was 2000 ppm, the temperature increased to 355° C., showing a 5° C. rise in temperature. Any further addition had almost no effect on the reduction of NOx.

Figure 3:
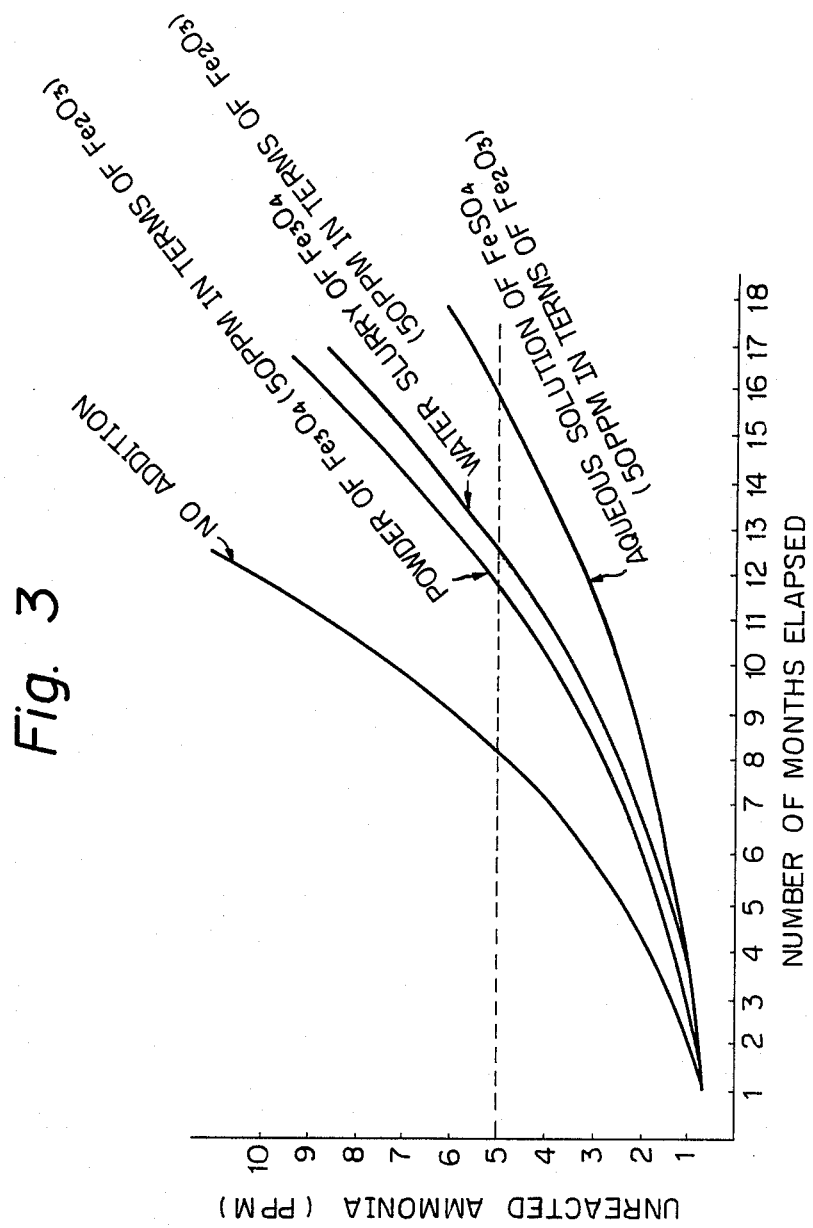
FIG. 3 shows the amount of unreacted ammonia which changes during continuous operation of the boiler in the cases where an aqueous solution of $FeSO_4$, a water slurry of $Fe_3O_4$, and a powder of $Fe_3O_4$, are, respectively, charged into the mill installed in a coal fuel line, as well as the case where no additive is employed.

Changing the amount of unreacted ammonia as the operation of a boiler proceeds was examined for the case of addition to a mill installed in a coal fuel line of 50 ppm of an aqueous solution of ferrous sulfate for dust coal in accordance with the present invention, as well the case of not adding any, the amount of NOx at the denitrizer inlet being assumed to be 450 ppm and the denitration rate 50%. The results are shown in FIG. 3.

When the catalyst is subjected to deactivation, the amount of ammonia injected is increased to maintain the denitration rate at 50%. However, when the amount of unreacted ammonia exceeds 5 ppm, replacement of the denitrate catalyst is required. As shown in FIG. 3, it took 8 months to reach a level of 5 ppm of unreacted ammonia in the case where no additive was employed and 17 months in the case where a ferrous sulfate aqueous solution is added in an amount of 50 ppm. This indicates that the addition of an iron compound extends the life of a denitrate catalyst to more than twice its original length.

When the amount of unreacted ammonias exceeds 5 ppm, the unreacted ammonia reacts with SO₃ present in the gas to produce ammonium hydrogen sulfate NH₄HSO₄ which adheres to such apparatus as air heaters and causes clogging.

Thus an aqueous solution of ferrous sulfate is very effective because of its extremely small particle diameter of 50 Å. When the iron particles are smaller than 100 mesh pass, a water slurry and powder are also effective, and the smaller the particle size, the greater the effect.

EXAMPLE 2

Table 2 shows the results obtained by pulverizing to 100 mesh pass a water slurry consisting of ferrosoferric oxide (10% by weight in terms of Fe₂O₃) and 5% by weight of a surface active agent (for example an anionic

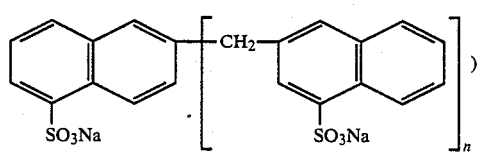

and then by charging the pulverized water slurry at a point upstream of the mill installed in a coal fuel line. The load of the boiler and the ratio of O₂ at the ECO outlet were set to 175 MW and 4%, respectively. Water slurries of Fe₃O₄ were prepared by adding 5 ppm, 50 ppm and 2000 ppm in terms of Fe₂O₃ to the fuel.

TABLE 2

|  | No addition | Water slurry of Fe₃O₄ | | |
| --- | --- | --- | --- | --- |
| Amount of additive added (ppm) (in terms of Fe₂O₃) | — | 5 | 50 | 2000 |
| NOx before denitrizer inlet (ppm) | 410 | 400 | 386 | 379 |
| NOx before denitrizer outlet (ppm) | 195 | 185 | 175 | 167 |
| Reduced amount of NOx at denitrizer outlet (ppm) | 215 | 214 | 211 | 212 |
| Denitration rate (%) | 52.4 | 53.5 | 54.7 | 55.9 |
| Amount of ammonia injected (kg/H) | 61 | 56 | 49 | 45 |
| Leakage of ammonia at denitrizer outlet (ppm) | 1 or less | 1 or less | 1 or less | 1 or less |
| Load (MW) | 175 | 175 | 175 | 175 |
| ECO outlet O₂ (%) | 4.0 | 4.0 | 4.0 | 4.1 |
| ECO outlet gas temperature (°C.) | 350 | 351 | 352 | 358 |

Note:
NOx is observed value before converting into O₂ 6%.

EXAMPLE 3

Table 3 shows the results obtained by charging a powder (100 mesh-pass) of ferrosoferric oxide (magnetite) at a point upstream of the mill installed in a coal fuel line. The load of the boiler and the ratio of O₂ at the ECO outlet were set to 175 MW and 4%, respectively. The respective amounts of additive were predetermined at 5 ppm, 50 ppm and 2000 ppm.

TABLE 3

|  | No addition | Powder of Fe₃O₄ | | |
| --- | --- | --- | --- | --- |
| Amount of additive added (ppm) (in terms of Fe₂O₃) | — | 5 | 50 | 2000 |
| NOx before denitrizer inlet (ppm) | 410 | 400 | 388 | 381 |
| NOx before denitrizer outlet (ppm) | 195 | 186 | 177 | 169 |
| Reduced amount of NOx at denitrizer outlet (ppm) | 215 | 214 | 211 | 212 |
| Denitration rate (%) | 52.4 | 53.5 | 54.4 | 55.6 |
| Amount of ammonia injected (kg/H) | 61 | 56 | 48 | 46 |
| Leakage of ammonia at denitrizer outlet (ppm) | 1 or less | 1 or less | 1 or less | 1 or less |
| Load (MW) | 175 | 175 | 175 | 175 |
| ECO outlet O₂ (%) | 4.0 | 4.0 | 3.9 | 4.0 |
| ECO outlet gas temperature (°C.) | 350 | 351 | 353 | 362 |

Note:
NOx is observed value before converting into O₂ 6%.

As shown in FIG. 3 which shows the amount of unreacted ammonia which changes during continuous operation of a boiler, it took 13 months to reach 5 ppm in the case of adding the Fe₃O₄ water slurry (50 ppm to fuel in terms of Fe₂O₃) and 12 months in the case of adding the Fe₃O₄ powder (50 ppm to fuel in terms of Fe₂O₃), thus showing that an extended life of an extra 4 to 5 months was obtainable in comparison with 8 months in the case where no additive was employed.

As explained above, according to the present invention, a relatively small amount of an iron compound is added to a mill or at a point upstream of the mill. After burning, the added iron compound is converted to $Fe_2O_3$ or $Fe_3O_4$ while adhering to the surface of dust such as to coat catalyst poisoning substances such as alkali metals, and the coated substance adheres to the catalyst. Therefore, the period in which the catalyst is subjected to deactivation is considerably prolonged. It is apparent that because deactivation of a catalyst due to the physical erosion of coal dust is inevitable, the replacement of the catalyst will always be necessary to some extent. However, the method of the present invention provides the catalyst with a markedly extended life and represents a significant financial advantage in comparison with conventional methods.

Furthermore, the method of the present invention solves such problems as physical erosion due to the use of an iron compound powder, rising drafts caused by excessive iron adhesion in a reaction vessel, and high cost due to the large amount of additive employed in comparison with a conventional method in which a powder of an iron compound is charged just before and after the denitrizer. Iron compounds are relatively low in cost and produce no unfavorable side effects in the range of 5 to 2000 ppm for dust coal.

In Examples 4-8, the burning conditions of the boiler and the fuel properties were as follows:
(1) burning conditions: burning was automatically carried out so as to give an excess air ratio of 4% $O_2$.
(2) fuel: mixed coal of domestic coal and imported coal ratio (fixed carbon/volatile matter) ... about 1.8 nitrogen matter 1.3%.
(3) boiler operation: in the case of FIGS. 4 and 5, the maximum load operation mode (only during the gas analysis); in the case of FIGS. 6 and 7, the normal operation mode.

EXAMPLE 4

A mixed aqueous solution of ferrous sulfate, vanadium sulfate and tungstate [in amounts of 30 ppm (in terms of $Fe_2O_3$), 15 ppm (in terms of $V_2O_5$) and 5 ppm (in terms of $WO_3$), respectively] was dropped into coal upstream of the mill.

EXAMPLE 5

Ferrous sulfate, ammonium metavanadate, tungsten oxide [in amounts of 30 ppm (in terms of $Fe_2O_3$), 15 ppm (in terms of $V_2O_5$) and 5 ppm (in terms of $WO_3$), respectively], an anionic surface active agent (in an amount of 5% by weight with respect to the overall weight)

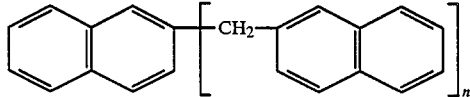

and water were mixed together and pulverized for several hours in a sand mill to obtain a water slurry having an average particle diameter of several microns or less, and this water slurry was added to coal.

EXAMPLE 6

A powder mixture of ferrosoferric oxide, vanadium pentaoxide and tungsten oxide [in amounts of 30 ppm (in terms of $Fe_2O_3$), 15 ppm (in terms of $V_2O_5$) and 5 ppm (in terms of $WO_3$), respectively], and silicon, as well as trichlene (about 1% by weight with respect to the overall weight), were pulverized in a ball mill to obtain powder having an average particle diameter of 2 to 3 $\mu m$ or less. The powder was then coated with silicon by means of a ribbon blender and added to coal.

In addition, the following samples were prepared, that is, sample (1) in which no additive was used, sample (2) in which a powder of $Fe_3O_4$ (pulverized to about 2 to 3 $\mu m$) was added in an amount of 50 ppm to coal, and sample (3) in which an aqueous solution of ferrous sulfate was added in an amount of 50 ppm to coal.

Figure 4:
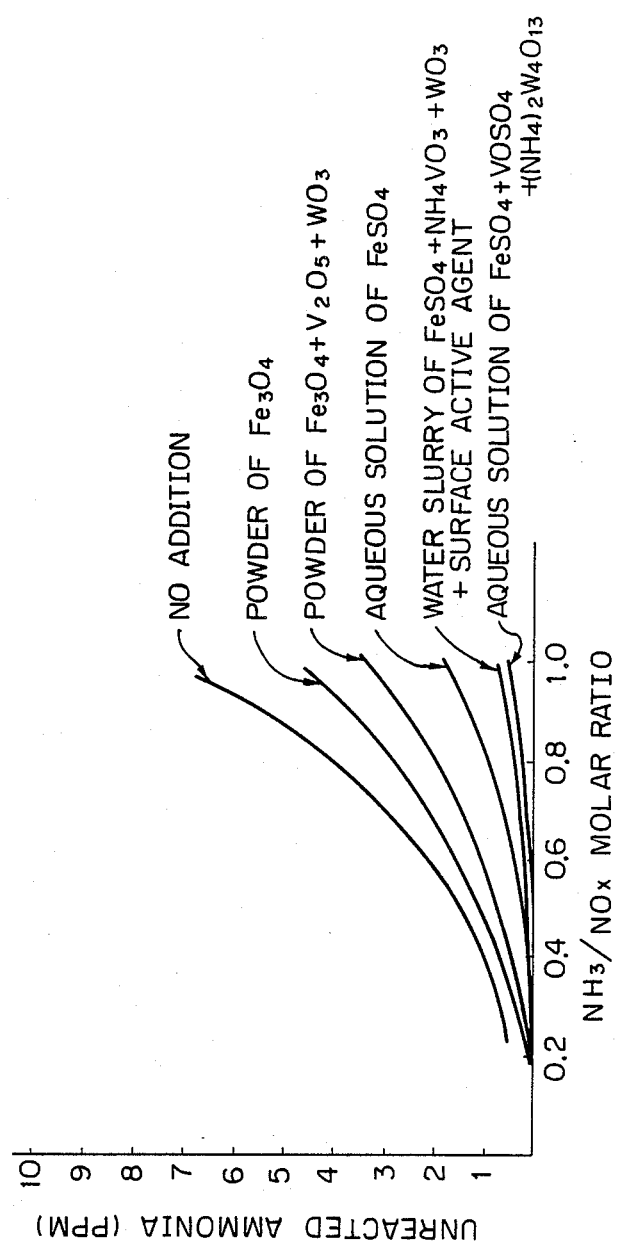
FIG. 4 shows the activity of the catalyst by means of a graph showing the relationship between the amount of unreacted ammonia and the molar ratio in relation to injected ammonia ($NH_3/NOx$) for each of the various kinds of catalytic additives.

FIG. 4 shows the results of these Examples 4-6 and samples (1)-(3). More specifically, the graph of FIG. 4 shows the conditions of the catalysts which had been used for 7 months after replacement. The maximum load was 520 T/H each. The respective activities of the catalysts may be compared with each other on the basis of the relationship between the amount of unreacted ammonia and the molar ratio in relation to injected ammonia ($NH_3/NO_x$). In general, as the molar ratio becomes higher, the amount of unreacted ammonia increases correspondingly. Therefore, a comparison between the effects of the additives at the point where the molar ratio is 0.5 clearly shows that there are differences in terms of effect: namely, 1.5 ppm for sample (1) (no addition); 1.1 ppm for sample (2) (powder of $Fe_3O_4$); 0.3 ppm for sample (3) (aqueous solution of $FeSO_4$); 0.7 ppm for Example 6 (powder of $Fe_3O_4+V_2O_5+WO_3$); 0.2 ppm for Example 5 (water slurry of $FeSO_4+NH_4VO_3+WO_3$); and 0.1 ppm for Example 4 (aqueous solution of $FeSO_4+VOSO_4+(NH_4)_2W_4O_{13}$). It should be particularly noted that the smaller the particle diameter of the additive component, the greater the effect.

FIG. 5 shows the results of measurement of the amount of unreacted ammonia (ppm) carried out every time a predetermined operating time has elapsed by using the same catalytic additives. The burning conditions of the boiler and the fuel properties were substantially the same as those in the case of FIG. 4, i.e., almost the same kind of mixed coal was employed, and burning was carried out so as to give an excess air ratio of about 4% $O_2$. Although, the boiler is usually run in the normal operation mode, it was run under a maximum load of 520 T/H at the time of measurement for analysis. A comparison of the samples in terms of the molar ratio 0.5 after 12 months had elapsed from the star of the operation shows that the amount of unreacted ammonia decreased in the following order: namely, 9 ppm for sample (1) (no addition); 5 ppm for sample (2) (powder of $Fe_3O_4$); 3 ppm for Example 6 (powder of $FeSO_4+V_2O_3+WO_3$); 2 ppm for sample (3) (aqueous solution of $FeSO_4$); 1 ppm for Example 5 (water slurry of $FeSO_4+NH_4VO_3+WO_3$); and 0.3 ppm for Example 4 ($FeSO_4+VOSO_4+(NH_4)_2W_4O_{13}$). When the amount of unreacted ammonia exceeds 5 ppm, acid ammonium sulfate is rapidly produced in large amounts, resulting in AH being clogged.

Thus, the life of the catalyst can be extended to double that of a catalyst which consists of an iron compound powder only, and the present invention is thus highly profitable for industrial purposes. Although the additive is somewhat costly the industrial merits are so great that the slight rise in cost can be ignored.

Since vanadium and tungsten oxides are strong oxidizing catalyst, there is a fear of oxidation from $SO_2$ to $SO_3$ proceeding at the same time to cause low temperature corrosion. However, in the present invention the addition of such oxides is carried out in small amounts, and the generation of SO₃ is only about 7 to 9 ppm at the outlet of denitrizer, so that substantially no difference is found when comparing the case where oxides were added with the case where no additive was employed.

EXAMPLE 7

FIG. 6 shows data obtained when a powder of $Fe_3O_4$, $V_2O_5$ and $WO_3$ having an average particle diameter of 5 μm was added immediately before the mill in the following various mixing ratios with respect to fuel:
(1) 200 ppm; 100 ppm; and 30 ppm
(2) 200 ppm; 50 ppm; and 15 ppm
(3) 30 ppm; 15 ppm; and 5 ppm
(4) 5 ppm; 3 ppm; and 1 ppm
(5) no addition The catalytic compounds employed, fuel properties and the operating conditions of the boiler were the same as those employed in Example 6.

As will be clear from the graph, in the case where no additive was employed, the ratio of the activity of the catalyst used to its initial activity [ks/ks(0); ks: the constant of the reaction rate of the catalyst; ks(0): the constant of the reaction rate of the catalyst in its initial state $(Nm^3/m^2\cdot H\cdot atm)$] fell to 0.97 in 3 months, whereas the ratios of the samples (1), (2), (3) and (4) rose to 1.18, 1.11, 1.06 and 1.02, respectively, in 3 months. However, in the case of (1), the amount of SO₃ at the inlet of the denitrizer rapidly increased from 5 ppm to 40 ppm 2 months after the addition. As to (2) to (4), the amount of SO₃ at the inlet of the denitrizer was 8 to 9 ppm or less and therefore involved no problem.

EXAMPLE 8

FIG. 7 shows data obtained when a powder of $Fe_3O_4$, $V_2O_5$ and $WO_3$ having an average particle diameter of 5 μm was added in the following various mixing ratios:
(1) $Fe_2O_3$: $V_2O_5$ ... 35 ppm: 15 ppm
(2) $Fe_2O_3$: $WO_3$ ... 35 ppm: 15 ppm
(3) no addition The catalytic compounds employed, fuel properties and the operation conditions of the boiler were the same as those in Example 6.

As will be clear from the graph, in the case where no additive was employed, the ratio of the activity of the catalyst used to its initial activity [ks/ks(0)]fell to 0.97 in 3 months, whereas the ratios of the samples (1) and (2) rose to 1.04 and 1.02, respectively. Although the activity is somewhat weaker than that in the case of the additive ($Fe_2O_3+V_2O_5+WO_3$) shown in FIG. 6, the advantageous effect is clearly revealed.

As explained above, according to the present invention, a very small amount of at least one compound selected from the group consisting of vanadium compounds and tungsten compounds is added to a relatively small amount of an iron compound to thereby enable the rate at which the catalyst is poisoned by SOx to be lower than that in the case where an iron compound powder alone is employed. Accordingly, the life of the catalyst is greatly extended advantageously. In addition, there is substantially no adverse affect on the boiler, furnace or the like. Thus, the present invention provides great industrial profitability.

What is claimed is:

1. A method of controlling the deactivation of a denitrating catalyst in an exhaust denitration method using ammonium which comprises controlling the deactivation of a denitrating catalyst that is caused by an exhaust gas dust in a boiler, a furnace of the like which employs pulverized coal as fuel by adding to a fuel at a mill installed in coal fuel line or at a point upstream of the mill at least one iron compound in an amount of 5 to 2000 ppm, in terms of $Fe_2O_3$, on the basis of the amount of pulverized coal in the form of an aqueous solution, or a powder or water slurry containing coal particles capable of passing through a 100-mesh screen.

2. The method according to claim 1 wherein said iron compounds are water-soluble.

3. A method of controlling the deactivation of a denitrating catalyst comprising controlling the deactivation of a denitrating catalyst that is caused by an exhaust gas dust in a boiler, a furnace or the like which employs pulverized coal or heavy oil as fuel by adding to a fuel a mixture of at least one iron compound in an amount of 5 to 200 ppm, in terms of $Fe_2O_3$, and at least one compound selected from the group consisting of vanadium compounds in an amount of 2 to 50 ppm, in terms of $V_2O_5$ and tungsten compounds in an amount of 1 to 15 ppm (in terms of $WO_3$), said mixture being in the form of powder having an average particle diameter of 5 microns or less, a water slurry or an oil slurry of powder having an average particle diameter of 3 microns or less, or an aqueous solution.

4. The method according to claim 3 wherein the mixture of at least one iron compound and at least one compound selected from the group consisting of vanadium compounds and tungsten compounds is added in a boiler, a furnace or the like which employs pulverized coal as fuel by adding it to a mill installed in a coal fuel line or at a point upstream of the mill, said mixture being in the form of powder, a water slurry, an oil slurry, or an aqueous solution.

5. The method according to claim 1 in which said pulverized coal and iron compound are burned in the furnace or boiler and the exhaust gas resulting therefrom is mixed with dry ammonium gas at a point downstream of said furnace or boiler and passed through a denitration catalyst, whereby nitrous oxides in the gas are reduced to nitrogen.

* * * * *